M. LEITCH.
PROCESS FOR CLEANING GASOLENE.
APPLICATION FILED SEPT. 23, 1918.
1,351,047.
Patented Aug. 31, 1920.
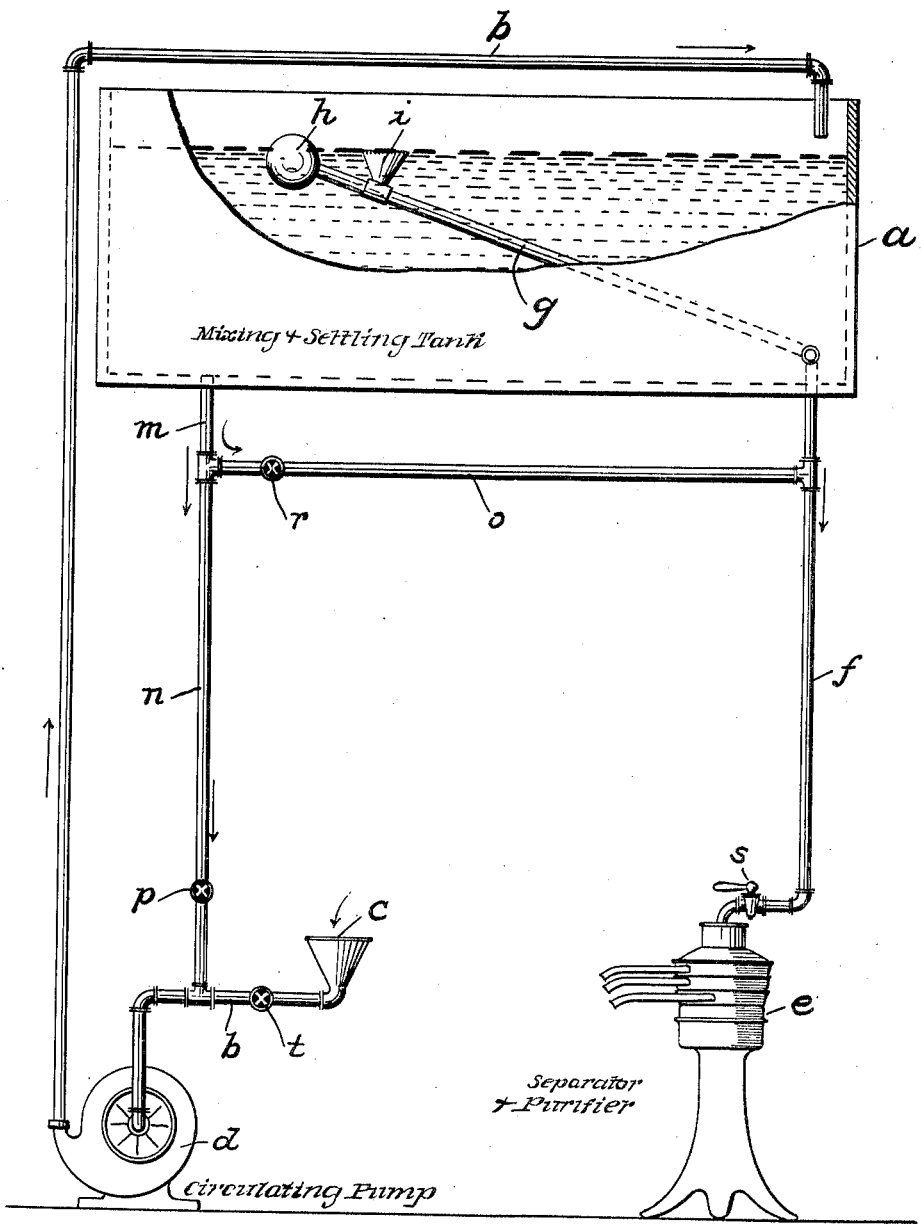
WITNESS:
INVENTOR
Meredith Leitch
BY
Frank S. Busser

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

PROCESS FOR CLEANING GASOLENE.

1,351,047.  Specification of Letters Patent.  Patented Aug. 31, 1920.

Application filed September 23, 1918. Serial No. 255,348.

*To all whom it may concern:*

Be it known that I, MEREDITH LEITCH, a citizen of the United States, residing at Poughkeepsie, county of Dutchess, and State of New York, have invented a new and useful Improvement in Processes for Cleaning Gasolene, of which the following is a full, clear, and exact description, reference being had to the accompanying drawings, which form a part of this specification.

My invention comprises a process for treating dirty gasolene to fit it for re-use in place of new gasolene. The process is applicable to the treatment of gasolene which, by any previous use, has been contaminated with greases in the form of animal and vegetable fats, dirt, and other impurities. The process is particularly adapted to the treatment of gasolene which has been used for cleaning clothes out of which have been washed the impurities above named. My process effects the removal, from gasolene, which has been used for cleaning clothes, of all the materials that have been washed out of the clothes with the exception of a negligible trace, so that the cleaned gasolene is restored to practically its original purity and is capable of any use to which new gasolene is adapted.

In the washing of clothes with gasolene, as carried on in dry cleaning establishments, the gasolene not only washes out the dirt but, acting as a solvent, takes up much grease in the form of animal oils and fats. These, if allowed to remain in the gasolene, soon decompose and give off disagreeable odors.

There are two well known methods of reclaiming dirty gasolene for cleaning purposes.

One method is by distillation, but many of the greases are more or less volatile and parts of them are carried over with the gasolene and will in time give it the same disagreeable odors that are mentioned above.

The other method is by treatment with sulfuric acid, followed by agitation, settlement, withdrawal of the acid, treatment with an alkali, and prolonged subsequent settling. This is described by Pawle on pages 142-143 of his "*Practical Handbook of Garment Dyeing and Cleaning,*" 1909. This method effects a substantial improvement in the gasolene but it still contains a material proportion of fatty matter and is not adapted for the cleaning of white goods, as Pawle himself states.

Experience has also shown that when gasolene, treated by the acid and alkali and settling method, is again used for cleaning purposes and is subjected, for the second time, to the alkali and settling treatment, it suffers still further deterioration. In fact, after successive restorative treatments, the gasolene progressively deteriorates in quality and eventually contains so large a proportion of fatty matter that it is practically unfit for further use.

Another serious objection to the last mentioned process is that it effects no quantitative recovery of even imperfectly purified gasolene. After prolonged settlement, say for forty-eight hours, it is found that the emulsion separates into three layers: an upper layer of relatively clean gasolene, an intermediate layer consisting of an emulsion of gasolene, soap, dirt and water, and a lower layer of water. About 6½ per cent. of the gasolene remains in the intermediate layer.

I have discovered that if, instead of relying to effect separation upon the addition of acid and alkali followed by settlement, the dirty gasolene is treated merely with a strong alkali, to which is added a large proportion of water, and the emulsion so formed is then subjected to the action of centrifugal force, and while said force is operative separately withdrawing the gasolene and the heavier constituent (comprising water, soaps and unsaponifiables), all the gasolene will be recovered and will be restored to its original condition of purity and is adapted to the cleaning of white goods. A sample of gasolene that has been centrifuged between one and two minutes in a properly designed machine comprises four layers: an upper layer of gasolene, a second layer of soap and light dirt, a third layer of water, and a bottom layer of heavy dirt. There is no layer of soap emulsified with a material proportion of gasolene. All the gasolene is in the upper layer, and it is in its originally pure condition.

I am aware that in certain arts separation by centrifugal force has been employed as a substitute for separation by gravity for the purpose, and with the result, of greatly expediting the separation. In treating used gasolene, however, separation by gravity, no matter how prolonged, is ineffective to effect the recovery of all the gasolene or the restoration of that portion which is recovered to its condition of original purity. The application of centrifugal force does not, therefore, perform merely the function of expediting the separation. Moreover, the mode of application of centrifugal force is a factor of importance upon which nothing in other arts in which centrifugal force has been employed throws any light and which has been ascertained only by prolonged experiment and numerous tests under practical working conditions.

After the conception of the idea of applying centrifugal force, what might be called the natural and obvious procedure was adopted, namely: after the addition of the alkali, permitting the mixture to stand to allow a large part of the dirt and water to settle, then decanting off the bottom layer of dirt and water, and then subjecting the remaining liquid to the action of centrifugal force in an ordinary centrifugal separator. While, by this procedure, the old process was somewhat expedited, the recovery was not quantitative and the quality of the gasolene was not appreciably improved. When, however, after the addition of alkali and water and thorough agitation, only a limited time for gravity separation was allowed, or when, without preliminary settlement, the entire emulsion was subjected to the action of centrifugal force, a practically absolutely quantitative yield of clean gasolene was obtained. Moreover, after repeated re-use and repeated restorative treatments, there was no appreciable deterioration in the quality of the gasolene, which continued to be adapted for the cleaning of the finest class of white goods.

These experiments demonstrated the non-equivalency of gravity and centrifugal force, in that the latter does not merely expedite the separation, but effects a complete separation and the removal from the recovered gasolene of deleterious substances which cannot be removed by the most prolonged settlement. The reason for the comparative ineffectiveness of the gravity process may, probably, be explained as follows:

The fatty matter in contaminated gasolene may be divided into two classes, which may be called "saponifiables" and "unsaponifiables." By the addition of an alkali the saponifiables are converted into soaps soluble in water. These soaps, if given time enough, will separate out with the water by gravity. Such a treatment of course substantially improves the quality of the gasolene but by no means restores it to its original condition of purity, because the unsaponifiables are still left in the gasolene.

By the term "unsaponifiables" I mean to include those substances, such as alcohols (cholesterol and phytosterol) and any other fatty or greasy materials which are not readily acted upon by an alkali. These are generally insoluble in water and are slowly soluble in gasolene. Thus, Lewkovitsch, Vol. I, p. 585, states: "Cholesterol is sparingly soluble in low boiling petroleum ether in the cold." However, if these unsaponifiables are present when gasolene, contaminated as above described, is treated with an alkali, they will be held temporarily in an emulsion with the soaps (saponifiables and alkali) and thus be temporarily protected from the solvent action of the gasolene. If the emulsion is allowed to stand for a length of time required to cause it to separate into distinct layers, these unsaponifiables escape from the emulsion and pass into solution in the gasolene. Indefinite prolongation of the settling operation, therefore, will be ineffective to restore the gasolene to its originally uncontaminated condition. The purely mechanical affinity of the gasolene for the soaps and dirt probably explains the formation of an intermediate layer of these constituents.

It will be apparent that when gasolene, treated by the alkali and settling method, is again used for cleaning purposes, still more unsaponifiables, as well as a fresh quantity of saponifiables, will be taken up; and when the gasolene is subjected, for the second time, to the alkali and settling treatment, it will be still further reduced in quantity and will contain approximately double the quantity of unsaponifiables that it contained at the end of the first treatment. Hence, as hereinbefore stated, after successive restorative treatments, the gasolene progressively deteriorates in quality and what gasolene remains is hardly fit for further use.

While the successful carrying out of my process is not dependent on the employment of any particular apparatus, I have successfully employed the simplified apparatus illustrated in the accompanying drawing, in which the figure is a side elevation, partially in section and somewhat diagrammatic.

An overhead tank $a$ is connected, by means of a pipe $b$ with a funnel $c$. A pump $d$ is interposed in the pipe $b$. $e$ is a centrifugal separator and purifier, preferably of the type set forth in the patent granted October 29, 1918, to Frank S. Snyder, No. 1,283,343. Leading to the separator and purifier $e$ is a pipe $f$, which communicates, within the tank, with a pipe $g$, which has a swiveled connection with the pipe $f$. On the free end of the pipe $g$ is a float $h$. Carried by the pipe $g$, and communicating therewith, is a funnel $i$, which is so positioned vertically relatively to the float that whatever the position of the float the mouth of the funnel will just underlie the surface of the liquid. Depending from the bottom of the tank is a pipe $m$, from which diverge pipes $n$ and $o$. The pipe $n$ communicates with pipe $b$ between the funnel $c$ and the pump $d$ and is provided with a valve $p$. The pipe $o$ communicates with the pipe $f$ and has a valve $r$. A valve $s$ is applied to the pipe $f$ and there is a valve $t$ on pipe $b$ between its connection with pipe $n$ and funnel $c$.

The gasolene to be cleaned and an alkali, such as a strong solution of caustic soda, are poured into the funnel $c$, from which they are pumped, through pipe $b$, into the tank $a$. I then introduce a certain quantity of water. The valve $p$ is then opened and valve $t$ is closed and the liquid circulated endlessly through pipe $b$, tank $a$ and pipe $m$, to form a thorough emulsion of gasolene, soap (saponifiables and alkali), water and unsaponifiables.

After circulation and agitation, as above described, the emulsion may be allowed to settle for a limited time. Prolonged settlement, however, should be avoided, for reasons hereinbefore set forth; and inasmuch as no useful purpose is served by settlement for a restricted time, it is advisable, as soon as the circulation and agitation are stopped by shutting down the pump and closing the valve $p$, to open the valve $s$ and allow the emulsion to flow into the purifier and separator $e$. In the purifier and separator the emulsion cleanly separates into a wide inner layer of gasolene, and adjacent layer of soap, unsaponifiables and light dirts, and an outer layer of dirty water, much of the dirt carried by the outer layer being deposited on the wall of the bowl. The gasolene is separately drawn off by means, well understood in the art of centrifugal separators, for separately withdrawing the lighter liquid constituent of a liquid mixture.

When the float $h$ and funnel $i$, by reason of the withdrawal of the larger part of the emulsion, have swung down to the bottom of the tank, the valve $r$ is opened, and the remaining liquid is carried to the separator and purifier through the pipes $m$, $o$ and $f$.

It is important, if separation by settlement be contemplated, that the emulsion of gasolene, water and soaps should not be so thorough as to seriously obstruct separation by gravity. On the contrary, in my invention, the formation of an emulsion so thorough that it will not readily separate by gravity is a prerequisite to the most successful operation of the process.

The execution of the process is not dependent upon the addition of any precise quantities of alkali and water, which will depend upon the degree of contamination of the gasolene and may, in any case, be arbitrarily varied within certain limits. In the case of dirty gasolene of average quality, I prefer to add, to 100 parts of dirty gasolene, about three parts of four per cent. caustic soda solution and after this has had time to act on the greases add about twenty parts of water, the relative quantities being taken by weight. In no case, however, to secure the best results should the proportion of strong caustic soda solution be reduced below one part, or the proportion of added water be reduced below ten parts. By the addition of water there is provided a solvent for the soaps formed and a carrier to remove, from the bowl, a large part of the solid dirt present in the gasolene.

It will be clearly understood that centrifugal force is not an equivalent of gravity because the main function of centrifugal force is not to expedite the gravity process but to prevent, or break up, the bond between the soaps, dirt and a portion of the gasolene that would otherwise be indissolubly formed and to prevent the absorption by the gasolene of the unsaponifiables. These functions are not performed in gravity separation and the cleaned product resulting from gravity separation is smaller in quantity, and differs in composition, from the purified product resulting from centrifugation under proper conditions.

My process also differs from the hitherto used process of purifying gasolene in that there need not be, and preferably is not, any preliminary treatment with acid and in the deliberate addition of water, the addition of which, in the gravity separation process, would not facilitate the separation, but on the contrary would retard it and lead to the loss of a still greater proportion of gasolene than would otherwise occur.

While I have hereinbefore stated that all the gasolene is recovered in its original condition, the statement could be made less conservative and at the same time more accurate. In fact, dry cleaners, who have used gasolene treated by my process, have found it actually superior to new gasolene and have found the quality to improve by each treatment for several repetitions.

Having now fully described my invention, what I claim and desire to protect by Letters Patent is:

1. The process of purifying used gasolene which comprises so thoroughly emulsifying the gasolene with an alkaline solution that it does not readily separate by gravity, and then, by centrifugal force, breaking down the emulsion and while said force is operative separately withdrawing the dirt, water and soap formed by the addition of the alkaline solution, and the gasolene.

2. The process of purifying used dirty and watery gasolene which comprises adding thereto a saponifying agent, and destroying the resultant emulsion of soap, water and gasolene by applying mechanical force to divide its constituents into a layer consisting of the entire content of gasolene in a pure condition and other layers containing soap, water and dirt unmixed and unemulsified with gasolene, and separately withdrawing the gasolene for re-use.

3. The process of purifying used dirty and watery gasolene which comprises adding thereto a saponifying agent, and subjecting the resultant emulsion of soap, water and gasolene to the action of centrifugal force of sufficient strength to separate all the gasolene and all the water which does not act as a carrier for the soaps into two distinct layers separated by a layer of soaps and light dirt, and while said force is operative separately withdrawing the gasolene.

4. The process of purifying used gasolene which comprises adding thereto a saponifying agent and water, and subjecting the emulsion of soap, water and gasolene thus formed to the action of centrifugal force and while said force is operative separately drawing off the gasolene from the water, dirt and soaps.

5. The process of purifying used gasolene which comprises adding thereto a strong alkali and an amount of water by weight several times in excess of the alkali, and subjecting the emulsion of soap, water and gasolene thus formed to the action of centrifugal force to cause the excess of water not required to dissolve the soaps to carry a substantial part of the dirt in a peripheral direction away from the layer of soaps formed outside the central zone of pure gasolene.

6. The process of purifying used gasolene which comprises adding thereto water and an alkali and agitating the mixture, thereby forming an emulsion of water, soap, gasolene and unsaponifiable matter, and then, before a substantial proportion of the unsaponifiable matter dissolves in the gasolene, separating the gasolene from the water and soap and the unsaponifiable matter emulsified therewith.

7. The process of purifying used gasolene which comprises adding thereto water and an alkali and agitating the mixture, thereby forming an emulsion of water, soap, gasolene and unsaponifiable matter, and then, before a substantial proportion of the unsaponifiable matter dissolves in the gasolene, subjecting the mixture to the action of mechanical force to separate the gasolene from the water and soap and the unsaponifiable matter emulsified therewith.

8. The process of purifying used gasolene which comprises adding thereto water and an alkali and agitating the mixture, thereby forming an emulsion of water, soap, gasolene and unsaponifiable matter, and then, before a substantial proportion of the unsaponifiable matter dissolves in the gasolene, subjecting the mixture to the action of centrifugal force to separate the gasolene from the water and soap and the unsaponifiable matter emulsified therewith.

9. The process of treating gasolene containing saponifiable and unsaponifiable fats for the purpose of eliminating both of them, which comprises adding an alkali and agitating, thereby saponifying the saponifiable fats and temporarily emulsifying therewith the unsaponifiable fats, and then, before a substantial proportion of the unsaponifiable fats have gone into solution with the gasolene, subjecting the mixture to the action of centrifugal force, whereby the gasolene is separated before it has had time to dissolve the unsaponifiable fats.

10. The process of purifying used gasolene which comprises adding thereto a saponifying agent and an amount of water not less than ten per cent. of the amount of gasolene and subjecting the emulsion of soap, water and gasolene thus formed, to the action of centrifugal force and while said force is operative separately drawing off the gasolene from the water, dirt and soaps.

11. The process of purifying used gasolene which comprises adding thereto a saponifying agent and an amount of water not less than ten per cent. of the amount of gasolene, so thoroughly emulsifying the gasolene with the alkaline solution that it does not readily separate by gravity, and then, before a substantial proportion of the unsaponifiable matter dissolves in the gasolene, applying centrifugal force to separate the gasolene from the dirt, soap, water and the unsaponifiable matter emulsified therewith.

12. The process of purifying used gasolene which comprises adding thereto a saponifying agent and an amount of water not less than ten per cent. of the amount of gasolene and subjecting the emulsion of soap, water and gasolene thus formed to the action of centrifugal force of sufficient strength to separate all the gasolene and all the water which does not act as a carrier for the soaps into two distinct layers separated by a layer of soaps and light dirt, and while said force is operative separately withdrawing the gasolene.

In testimony of which invention, I have hereunto set my hand, at Poughkeepsie, N. Y., on this 17th day of September, 1918.

MEREDITH LEITCH.